(12) United States Patent
Endresen et al.

(10) Patent No.: US 8,022,655 B2
(45) Date of Patent: Sep. 20, 2011

(54) ROBOT CONTROL SYSTEM COMPRISING A PORTABLE OPERATING DEVICE WITH SAFETY EQUIPEMENT

(75) Inventors: Jan Endresen, Asker (NO); Erik Carlson, Nesoddtangen (NO); Ralph Sjöberg, Västerås (SE); Olov Nylén, Västerås (SE)

(73) Assignee: ABB Research Ltd., Zürich (CH)

( * ) Notice: Subject to any disclaimer, the term of this patent is extended or adjusted under 35 U.S.C. 154(b) by 547 days.

(21) Appl. No.: 11/919,822

(22) PCT Filed: May 2, 2006

(86) PCT No.: PCT/EP2006/061961
§ 371 (c)(1),
(2), (4) Date: Jan. 22, 2009

(87) PCT Pub. No.: WO2006/117363
PCT Pub. Date: Nov. 9, 2006

(65) Prior Publication Data
US 2009/0212731 A1      Aug. 27, 2009

(30) Foreign Application Priority Data

May 2, 2005   (EP) .................................... 05103640

(51) Int. Cl.
*B25J 19/00* (2006.01)
(52) U.S. Cl. ........... 318/568.24; 318/568.11; 318/568.1; 318/567; 318/560
(58) Field of Classification Search ............. 318/568.24, 318/568.11, 568.1, 567, 560
See application file for complete search history.

(56) References Cited

U.S. PATENT DOCUMENTS

| 6,134,102 | A | 10/2000 | Worn et al. |
| 6,175,206 | B1 * | 1/2001 | Ueno et al. .................. 318/568.1 |
| 6,674,259 | B1 * | 1/2004 | Norman et al. .......... 318/568.11 |
| 7,415,321 | B2 * | 8/2008 | Okazaki et al. ............... 700/245 |
| 2005/0055130 | A1 | 3/2005 | Carlson et al. |

FOREIGN PATENT DOCUMENTS

| EP | 1407860 A | 4/2004 |
| JP | 09117888 A | 9/1997 |

OTHER PUBLICATIONS

PCT/ISA/210—International Search Report—Jul. 12, 2006.

* cited by examiner

*Primary Examiner* — Walter Benson
*Assistant Examiner* — David Luo
(74) *Attorney, Agent, or Firm* — Venable LLP; Eric J. Franklin

(57) ABSTRACT

A robot controller including a control unit and a portable device (TPU) for teaching and manually operating the robot. The TPU includes safety equipment, a safety TPU-part having a first communication unit and a main TPU-part having a third communication unit. The control unit includes a safety control part having a second communication unit and a main control part having a forth communication unit. The first and second communication units form a first communication channel for transferring data from the TPU to the control unit. The third and fourth communication units form a second communication channel for transferring data between the TPU and the control unit. Each of the main TPU-part, safety TPU-part, main control part, and safety control part includes a processor for generating and/or handling the data. Each communication unit is connected to a network and forms a node in the network.

8 Claims, 3 Drawing Sheets

ROBOT CONTROL SYSTEM COMPRISING A PORTABLE OPERATING DEVICE WITH SAFETY EQUIPEMENT

CROSS-REFERENCE TO RELATED APPLICATIONS

This application claims priority to European patent application 05136408 filed 2 May 2005 and is the national phase under 35 U.S.C. §371 of PCT/EP2006/061961 filed 2 May 2006.

FIELD OF THE INVENTION

The present invention relates to a robot controller comprising a control unit for controlling at least one industrial robot and a portable operating device for teaching and manually operating the robot.

PRIOR ART

An industrial robot is programmed to carry out work along an operating path. In order to program or teach the robot the work, the robot is manipulated to positions along the desired operating path. These positions are stored as instructions in a memory in the control unit. During operation of the robot, the program instructions are executed, thereby making the robot operate as desired. A person controlling a robot is denoted an operator. In the following the words user and operator are used synonymously.

An industrial robot can be operated in at least two different modes: automatic and manual. When the robot is in the manual operation mode, the robot is controlled by means of a portable operator control device, generally denoted a Teach Pendant Unit, and called hereafter a TPU. A robot operator uses the TPU for manually controlling the robot, for example to teach or program the robot to follow an operating path. When the robot is in manual mode, the TPU has exclusive right to operate the robot and thus no other control device is allowed to control the robot.

A TPU normally comprises operator control means, for example a joystick, a ball, a set of buttons or any combination thereof, a visual display unit, and safety equipment such as an enabling device and a stop device, for example an emergency stop button, or a conditional stop button. The enabling device is for example a switch or a push button, which has to be pressed by the operator to enable control of the robot by the TPU. The enabling device affects the current to the motors of the robot. When the enabling device is released it is not possible to operate the robot by means of the TPU. For safety reasons the TPU is provided with either an emergency stop button, which makes it possible for the operator to unconditionally stop the robot at any time by, or a conditional stop button, which makes it possible for the operator to conditionally stop the robot.

Today, the TPU and the control unit are connected through a cable and communication between the TPU and the control unit is done through a direct point-to-point connection. The communication data exchanged between the TPU and the control unit includes commands and information. Hardware signals representing the state of the safety equipment are transferred from the TPU to the control unit by means of a separate wire in the cable. However, when having a direct point-to-point connection between the TPU and the control unit, and the TPU should be used together with another control unit, the operator must manually move the connection to the other control unit.

EP 1 407 860 discloses a wireless solution to this problem. The document discloses a robot controller having a TPU including two transmitting means for wirelessly transmitting emergency stop signal data and a control unit including two receiving means for wirelessly receiving the emergency stop signal data. The transmitting and receiving means form two wireless communication channels for communicating redundant emergency stop signal data. Further, the TPU and the control unit includes transmitting and receiving means forming a third communication channel used to wirelessly communicate general data, such as robot position data, jog feeding command data and the like, between the TPU and the control unit. An advantage achieved with such a controller is that the communication between the TPU and the control unit becomes clearly defined. The channels use different frequencies and the communication is a direct point-to-point communication. A disadvantage with this point-to-point communication is that it requires expensive hardware.

For a wireless connection, as well as for a non-wireless connection, there is a desire to be able to use network communication between the TPU and the control unit. This is, for example, advantageous in a robot system including a plurality or robots and one or more robot controllers. Another advantage with having a network communication is that it is cheaper than a point-to point communication, since cheap standard components can be used.

OBJECTS AND SUMMARY OF THE INVENTION

The object of the present invention is to provide an improved robot controller, which makes it possible to, with maintained safety, use network communication between the TPU and the control part.

According to the invention the TPU comprises a safety TPU-part having a first communication unit for transmitting communication data and a main TPU-part having a second communication unit for transmitting and receiving communication data, and the control unit comprises a safety control part having a third communication unit for receiving communication data and a main control part having a forth communication unit for transmitting and receiving communication data. The first and third communication units are arranged such that they form a first communication channel for transferring communication data including information regarding the status of safety equipment from the TPU to the control unit, and the second and fourth communication units are arranged such that they form a second communication channel for transferring general communication data between the TPU and the control unit. The invention is characterized in that each of the main TPU-part, the safety TPU-part, the main control part, and the safety control part comprises a central processing unit adapted for generating and/or handling said communication data, each of the communication units are connected to a computer network, and each of the communication units forms a node in the computer network.

According to the invention, the TPU is divided into a main TPU-part and a safety TPU-part, and the control unit is divided into a main control part and a safety control part. Each of the parts has its own hardware and software, for example its own CPU, its own communication equipment, and its own software for generating communication data and handling received communication data.

Thus, communication of safety data between the TPU and the control unit becomes completely separated from the other communication between the TPU and the control unit. Since each of the main TPU-part, the safety TPU-part, the main control part, and the safety control part is provided with a central processing unit adapted for generating and/or handling communication data, it is possible to generate and process safety data totally separated from the generation and handling of general data, and thereby to increase the security of the generation and transfer of safety data. Another advantage gained with a separate generation and handling of the safety data, is that safety certification of the safety system of the robot is simplified. It will probably be sufficient to certify only the safety TPU-part and the safety control part. Thus, the certifying procedure becomes considerably easier and smothers. Since the amount of safety data to be transferred and handled is low (only a few safety signals), it is possible to have a complex error handling of the safety data to a low cost. The separate generating and handling of the safety data makes is possible to have special safety check routines for the safety data, which do not influence the general communication data. Thereby the robustness of the safety handling is increased.

The invention makes it possible to implement the safety system of the robot by means of a computer network with maintained or even increased safety with respect to transfer of safety signals.

The communication units are preferably arranged such that all communication data regarding safety equipment, also including redundant status information, is transferred between the safety TPU and the safety control part by means of the first and third communication units. Transferring all safety data on the same channel reduces the hardware needed for the communication, and thus reduces the hardware costs.

In this context a computer network is a communication route to which a plurality of autonomous units with unique network addresses is connected, and communication between the units is carried out by sending and receiving messages, comprising communication data, to and from the addresses. Each autonomous unit in the network is a node in the network and data is sent between the nodes. Preferably, a computer network includes a router, which directs data between the nodes. A communication unit is adapted to produce messages to be sent to other nodes in the network and/or to interpret messages received from other nodes in the network. The communication units are either implemented by hardware, software or a combination thereof.

According to an embodiment of the invention, the safety equipment includes a manually operated stop device, which upon activation stops robot motions, and a manually operated enabling device, which upon activation enables manual motion of the robot, and said information regarding the status of the safety equipment includes information regarding the status of the stop device and the enabling device. It is advantageous to transfer all safety data on the same communication channel as hardware cost is reduced.

According to an embodiment of the invention, the communication units are connected to a common network and each of the communication units has a unique address.

According to another embodiment of the invention, the first and the fourth communication unit are connected to a first network and the second and third communication units are connected to a second network. Thereby it is possible to use different networks for transfer of safety data and for transfer of other data and commands. For example, a network with high demand on safety is used for transferring safety data, and a network with less demand on safety is used for transferring commands and other types of communication data.

The main control part and the main TPU part are adapted for communication with each other, and the safety control part and the safety TPU part are adapted for at least one-way communication with each other. The safety TPU-part comprises means for generating communication data including information regarding the status of the safety equipment, and the safety TPU-part comprises means for receiving communication data including information regarding the status of the safety equipment. This embodiment makes it possible to transfer safety related communication data between the safety TPU-part and the safety control part, and to transfer other communication data between the main TPU-part and the main control part. Thus, it is possible to separate safety data from the other communication between the TPU and the control unit.

When connecting the TPU to the robot controller for use in manual mode, i.e. for moving the robot or start a program, the safety TPU-part and the safety control part are exchanging data for safety signals, and the main TPU-part and the main control part are exchanging data for commands and other information. Thus, the communication between the safety TPU-part and the safety control part is independent of the communication between the main TPU-part and the main control part, which means that the communication of safety signals between the TPU and the control unit is independent of the other communication between the TPU and the control unit.

According to an embodiment of the invention the safety TPU-part comprises the safety equipment and based on the status of the safety equipment generates the communication data including the status of the safety equipment. This embodiment is advantageous due to practical reasons; such as there is no need to transfer the safety signals between the main and safety TPU-part.

According to an embodiment of the invention, the main TPU-part comprises the safety equipment and is adapted to provide one or more safety signals based on the status of the safety equipment, and the safety TPU-part is adapted to the read safety signals from the main TPU-part and on basis thereof generate communication data including the status of the safety equipment. The main TPU comprises the safety equipment, and the safety TPU-part handles the communication of information regarding the safety signals with the control unit.

According to an embodiment of the invention, the safety control part comprises a time check module, checking whether the communication data including the status of the safety equipment is received within a certain time frame or not. If data including the status of the safety equipment is not received within a certain time frame, the controller has to take a measure, for example stop the motion of the robot. Thus, the safety of the robot controller is increased.

Preferably, the safety control part also comprises a safety check module, checking the data received regarding the status of the safety equipment. For example, if redundant status signals are generated, the safety check may include checking whether the received status signals are equal or not. Thus, safety and protection against processor failure are ensured.

According to an embodiment of the invention the safety equipment comprises a manually operated stop device, which upon activation stops robot motions, and the information regarding the status of the safety equipment includes information regarding the status of the stop device. The safety control part comprises means for determining whether the robot should be stopped or not based on the received information. Preferably, the safety control part comprises a signal generating unit, generating a stop signal including information regarding whether the robot should be stopped or not, and the main control part comprises input means, receiving the stop signal from the safety control part and the main control part is adapted to stop the robot based on the stop signal. The stop device is for example an emergency stop button or a conditional stop button.

According to an embodiment of the invention the safety equipment comprises a manually operated enabling device, which upon activation enables manual control of the robot by means of the TPU, and the information regarding the status of the safety equipment includes information regarding the status of the enabling device. The safety control part comprises means for determining whether manual control of the robot by means of the TPU is permitted or not based on the received information regarding status of the enabling device. Preferably, the safety control part comprises a signal generating unit, generating an enabling signal including information regarding whether manual control of the robot by means of the TPU is permitted or not. The main control part comprises receiving means, receiving the enabling signal from the safety control part and the main control part is adapted to permit or not permit manual control of the robot based on the received enabling signal.

According to an embodiment of the invention, the signal generating unit is adapted to generate the enabling signal based on whether the communication data including the status of the safety equipment is received within the time frame or not, such that manual control of the robot is not permitted upon failure to receive information regarding the status of the enabling device within the time frame. Thus, the safety of the robot controller is increased.

According to an embodiment of the invention the main TPU-part and the main control part are arranged for network communication with each other and the safety TPU-part and the safety control part are arranged for network communication with each other. Each of the communication units has a unique address. Thus, it is ensured that the communication between the safety TPU-part and the safety control part is independent of the communication between the main TPU-part and the main control part.

According to an embodiment of the invention, each of the main TPU-part, the safety TPU-part, the main control part and the safety control part comprises a central processing unit. Thus, each of the parts has the power to process data.

Another object of the present invention is to provide a method for controlling an industrial robot, which makes it possible to use network communication between the TPU and the control part.

According to the invention the method comprises generating communication data including information regarding the safety equipment, transmitting the communication data including information regarding the safety equipment via a first network node, receiving the communication data including information regarding the safety equipment via a second network node, generating communication data excluding information regarding the safety equipment, transmitting the communication data excluding information regarding the safety equipment via a third network node, and receiving the communication data excluding information regarding the safety equipment via a fourth network node. Each node in a network has a unique address. By transferring safety data and other communication data between different nodes in the network, secure transfer of the safety data is achieved.

According to an embodiment of the invention communication data is transferred between the TPU and the control unit via a common network and each network node has a unique address.

According to an embodiment of the invention the communication data is transferred via two different networks, and the first and the fourth node belong to a first network, and the second and the third node belong to a second network.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
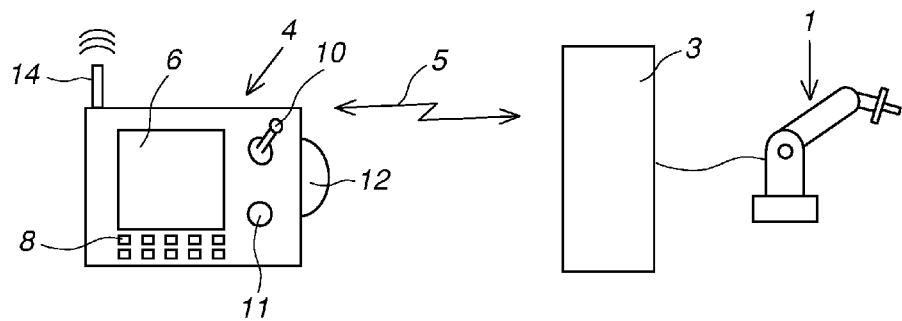
FIG. 1 shows an industrial robot including a control unit and a TPU.

FIG. 1 shows an industrial robot comprising a manipulator 1, a controller comprising a control unit 3 for controlling the manipulator, and a portable operator control device 4, in the following denoted a TPU (Teach Pendant Unit) for teaching and manually operating the manipulator. The TPU 4 communicates with the control unit 3 via a data link 5, for example a wireless data link. The TPU comprises a display screen 6, function keys 8, a joystick 10, an emergency stop button 11, and an enabling device 12. The TPU also includes and antenna 14 and a radio module for wireless communication with the control unit 3. The function keys 8 permit the operator to select various states for the control system. The joystick 10 is used for controlling the movement of the manipulator when the robot is manually operated. The enabling device comprises a button 12, which has to be pressed by the operator to enable control of the robot by the TPU. When the operator releases the button of the enabling device 12, the robot can no longer be operated by the TPU. The emergency stop button 11 causes an emergency stop upon activation. The enabling device 14 and the emergency stop device 15 are parts of the safety equipment of the TPU.

Figure 2:
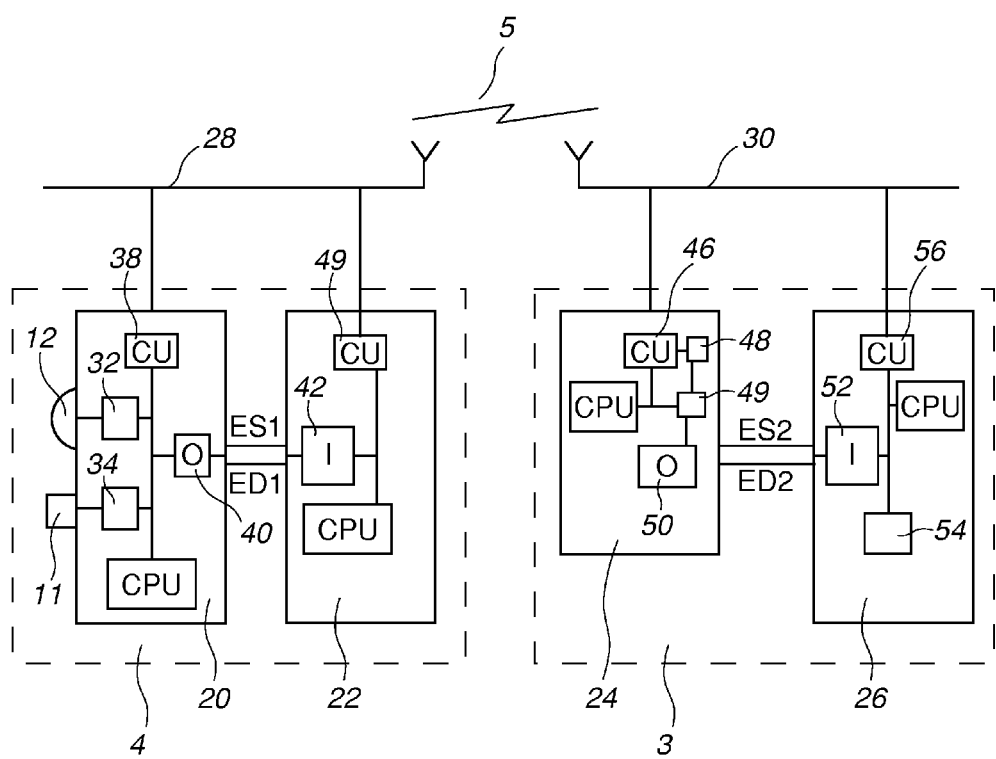
FIG. 2 shows a robot controller according to a first embodiment of the invention.

FIG. 2 shows a robot controller according to an embodiment of the invention. The robot controller comprises a TPU 4 having a main TPU-part 20 and a safety TPU-part 22, and a control unit 3 having a safety control part 24 and a main control part 26. Preferably, the main TPU-part 20 and the safety TPU-part 22 are hosted in the same casing. The safety control part 24 and the main control part 26 are for example hosted in the same casing. The main TPU-part 20 and the safety TPU-part 22 are connected to a data communication link 28, for example a data bus, and the safety control part 24 and the main control part 26 are connected to a data communication link 30, for example a data bus. The data communication links 28 and 30 are connected via the wireless data link 5. For example, the data link 5 is a wireless communication network and the communication units 38, 49, 46, 56 are nodes on the network. Other TPUs and control units can be connected to the same network.

The main TPU-part 20 comprises safety equipment for protecting a user against injury during manual control of the robot. In this embodiment the safety equipment comprises an emergency stop button 11 and an enabling device 12. However, in other embodiments the safety equipment instead may comprise a conditional stop button, or only an enabling device. The main TPU-part 20 further comprises an enabling device status detecting means 32, for detecting the status of the enabling device 12, e.g. detecting whether the enabling button 12 is pressed or released. There can be more than one detecting means 32 to achieve redundancy and thus to improve the safety of the enabling function. The enabling device status detecting means 32 generates an enabling device signal ED1 based on detected status of the enabling device. The main TPU-part 20 also comprises an emergency stop button status detecting means 34, for detecting the status of the emergency stop button 11, i.e. detecting whether the emergency stop button 11 is pressed or released. The emergency stop button status detecting means 34 generates an emergency stop signal ES1 based on detected status of the emergency stop button.

The main TPU-part 20 comprises a CPU for processing data and a communication unit 38 for communication with the main control part 26. The communication unit 38 is connected to the data communication link 28. The communication unit 38 is adapted for network communication. The communication unit 38 sends communication data including commands and information to the main control part 26. The main TPU-part 20 also comprises an output unit 40 for transferring the enabling signal ED1 and the emergency stop signal ES1 to the safety TPU-part 22.

The safety TPU-part 22 comprises an input unit 42 receiving the safety signals ES1, ED1 from the main TPU-part 20, and a communication unit 44 adapted for communication with the safety control part 24. The communication unit 44 includes communication data generating means, which generates communication data including information regarding the detected status of the safety equipment 11, 12. The communication data generating means generates communication data comprising one or more messages including information regarding the status of the enabling device and the emergency stop button. The communication data generating means comprises ether a communication data generating software process or a communication data generating circuit. The communication data generating means may generate messages according to any suitable well known communication protocol.

The communication unit 44 is adapted for network communication and is connected to the data communication link 28. The safety TPU-part 22 comprises a CPU for processing data.

The safety control part 24 comprises a communication unit 46 for communication with the safety TPU-part 22. The communication unit 46 is adapted for network communication and is connected to the data communication link 30. The communication unit 46 receives communication data including the state of the safety equipment.

The safety control part 24 further comprises a time check module 48, checking whether communication data including the status of the safety equipment is received within a certain time frame or not. The time frame is for example determined by the time it takes for the robot to move a largest distance allowed due to safety reasons.

The safety control part 24 comprises a signal generating unit 49 generating an emergency stop signal ES2 including information regarding whether the robot should be stopped or not, and an enabling signal ED2 including information regarding whether manual control of the robot by means of the TPU should be permitted or not. The signal generating unit 49 comprises means for determining whether the robot should be stopped or not and for determining whether manual control of the robot should be permitted or not, based on the received information. For example, if redundant safety equipment is used the received status data is compared and a decision is made based on the result of the comparison. The safety control part 24 receives information from the safety control part 24 regarding whether the communication data including the status of the safety equipment is received within a certain time frame or not and bases its decision thereon. Manual control of the robot is not permitted upon failure to receive status information from the enabling device within the time frame.

Thus, the safety control part 24 extracts information regarding the detected status of the enabling device from the received communication data and creates safety signals, in this case an enabling signal ED2 and an emergency stop signal ES2, based on the extracted information. The safety control part 24 comprises an output unit 50 for transferring the enabling signal ED2 and the emergency stop signal ES2 to the main control part 26.

The main control part 26 comprises an input unit 52 adapted to read the safety signals ES2, ED2 from the safety control part 24. The main control part 26 comprises an enabling circuit 54, often called the enabling chain. The enabling circuit comprises a switch that is opened or closed in dependence of the enabling signal ED2, and another switch that is opened or closed in dependence of whether the robot is in automatic or manual mode. If the robot is in automatic mode it is not possible to control the robot by the TPU. The enabling circuit 54 is connected to the motors of the robot. When the robot is in manual mode and the enabling device is not activated, the brakes are applied to the motors. Thus, the robot must be in manual mode and the enabling device must be activated for the operator to be able to manually move the robot. The main control part activates the emergency stop function based on the emergency stop signal ES2, i.e. according to the state of the emergency button.

The main control part 26 also comprises a communication unit 56 for communication with the main TPU-part 20. The communication unit 56 is adapted for network communication and is connected to the data communication link 30. The communication unit 56 receives communication data including commands and information from the main TPU-part. Each of the main control part 26 and a safety control part 24 comprise a CPU for processing data The communication units 38, 44, 56 comprise communication data generating means generating communication data. The communication data generating means generates messages, including the communication data, according to any known communication protocol. The communication data generating means comprises a communication data generating software process or a communication data generating circuit. The communication units 38, 46, 56 comprise communication data receiving means for receiving communication data. The communication data receiving means comprises a communication data receiving software process or a communication data receiving circuit. The communication units 38, 44, 46, 56 are either implemented by hardware or software. Each of the communication units has a unique address in the network.

Figure 3:
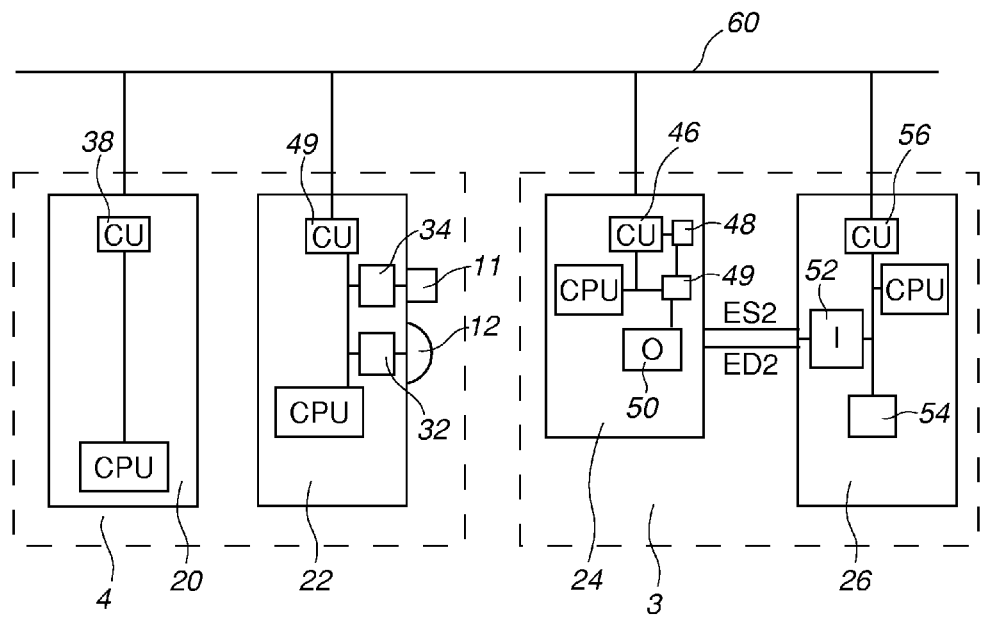
FIG. 3 shows a robot controller according to a second embodiment of the invention.

FIG. 3 shows a robot controller according to a second embodiment of the invention. Elements corresponding to the ones of the first embodiment, shown in FIG. 2, are given the same reference numbers in FIG. 3. The robot controller differs from the one shown in FIG. 2 in that the safety equipment 11, 32 is mounted on the safety TPU-part 22. The communication between the TPU and the control unit is done through a common network 60. The network 60 is wireless or not wireless. The communication units 38, 46, 49, 56 are connected to the network 60 and each communication units 38, 46, 49, 56 is a node in the network 60 and has a unique address.

In the following the method according to the invention is described with reference to FIG. 3. Communication data including information regarding the status of the safety equipment, i.e. the status of the enabling device 11 and the stop device 12, is generating by the communication unit 49. The status is for example stop device activated, stop device not activated, enabling device activated, and enabling device not activated. The communication data including information regarding the status of the safety equipment is transmitted from the communication unit 49, transferred via the network 60, and received by the communication unit 46.

The communication unit 38 generates communication data excluding information regarding the safety equipment, such as commands and information regarding other issues. The communication data excluding information regarding the status of the safety equipment is transmitted from the communication unit 38, transferred via the network 60, and received by the communication unit 56. The communication of data including and data excluding information regarding the status of the safety equipment is made independent of each other.

Figure 4:
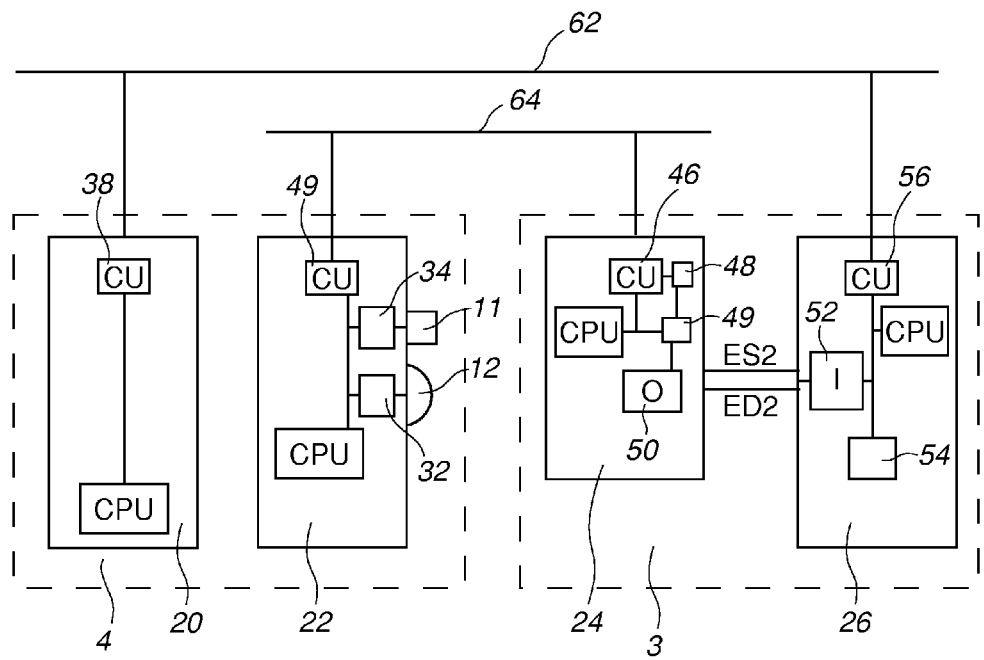
FIG. 4 shows a robot controller according to a third embodiment of the invention in which communication data is transferred via two networks.

FIG. 4 shows a robot controller according to a third embodiment of the invention. In this embodiment the main TPU-part 20 and the main control part 26 are connected to a first network 62 and the safety TPU-part 22 and the safety control part 24 are connected to a second network 64. For example, the networks 62 and 64 have different properties.

Figure 5:
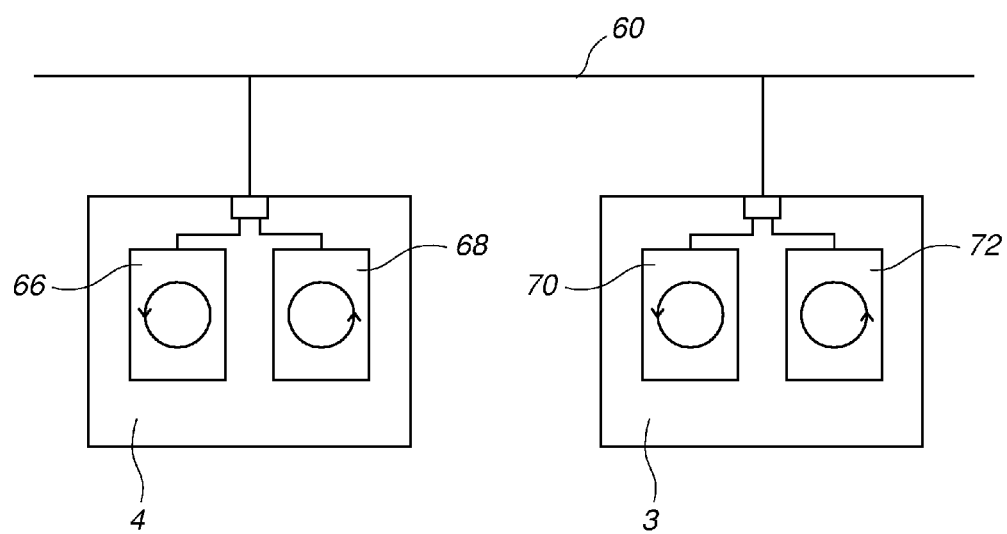
FIG. 5 shows a robot controller according to a fourth embodiment of the invention in which the communication units are implemented as software processes.

FIG. 5 shows a robot controller according to a fourth embodiment of the invention. In this embodiment the TPU 4 comprises a communication unit 66 comprising a first software process for communication with the control unit 3, and a communication unit 68 comprising a second software process adapted to produce and transmit communication data including information regarding the status of the safety equipment to the control unit 3. The control unit 3 comprises a communication unit 70 comprising a third software process adapted to receive and interpret communication data including information regarding the status of the safety equipment from the safety TPU-part, and a fourth communication unit 72 comprising a software process for communication with the main TPU-part. The first and fourth software processes are communicating with each other. The software processes 66, 68, 70, 72 are connected to a common network 60, and each software process has a unique address. The TPU and the control unit are nodes in the network and the software processes can be seen as sub-nodes in the network.

The present invention is not limited to the embodiments disclosed but may be varied and modified within the scope of the following claims. The communication between the TPU and the control unit can be done through any network using standard network components. The network can either be wireless or through a cable. The safety equipment does not necessarily have to include a stop button. In some applications an enabling device is sufficient.

In another embodiment of the invention each of the TPU and the control unit may comprise three or more pair of communication units, and two pair of communication units handles the safety communication data and/or two pair of communication units handles the other communication.

The safety equipment comprises equipment for protecting a user against injury during manual control of the robot, such as a stop device and/or an enabling device. However, the safety equipment may also include other types of safety equipment of the TPU.

The invention claimed is:

1. A robot controller, comprising:
a control unit for controlling at least one robot and a portable operating device, called hereafter a TPU, for teaching and manually operating the robot,
which TPU comprises a safety equipment, a safety TPU-part having a first communication unit for transmitting communication data and a main TPU-part having a second communication unit for transmitting and receiving communication data,
the control unit comprises a safety control part having a third communication unit for receiving communication data and a main control part having a forth communication unit for transmitting and receiving communication data,
the first and third communication units are arranged such that they form a first communication channel for transferring communication data including information regarding the status of safety equipment from the TPU to the control unit,
the second and fourth communication units are arranged such that they form a second communication channel for transferring general communication data between the TPU and the control unit,
wherein each of the main TPU-part, the safety TPU-part, the main control part, and the safety control part comprises a central processing unit adapted to generate and/or handle said communication data, each of the communication units are connected to a network, and each of the communication units forms a node in the network.

2. The robot controller according to claim 1, wherein said first communication channel is adapted to transfer all information regarding the status of safety equipment, including redundant status information.

3. The robot controller according to claim 1, wherein said safety equipment includes a manually operated stop device, which upon activation stops robot motions, and a manually operated enabling device, which upon activation enables manual motion of the robot, and said information regarding the status of the safety equipment includes information regarding the status of the stop device and the enabling device.

4. The robot controller according to claim 1, wherein the safety TPU-part comprises said safety equipment and based on the status of the safety equipment generates said communication data including the status of the safety equipment.

5. The robot controller according to claim 1, wherein the main TPU-part comprises said safety equipment and is adapted to provide one or more safety signals based on the status of the safety equipment, and the safety TPU-part is adapted to read said safety signals from the main TPU-part and on basis thereof generate said communication data including the status of the safety equipment.

6. The robot controller according to claim 1, wherein the safety control part comprises a signal generating unit, generating a stop signal including information regarding whether the robot should be stopped or not based on said status information, and the main control part comprises an input unit, receiving said stop signal from the safety control part and the main control part is adapted to stop the robot based on the stop signal from the safety control part.

7. The robot controller according to claim 1, wherein said safety equipment comprises a manually operated enabling device, which upon activation enables manual control of the robot by means of the TPU, and said information regarding the status of the safety equipment includes information regarding the status of the enabling device, and the safety control part comprises means for determining whether manual control of the robot by means of the TPU is permitted or not based on the received information regarding status of the enabling device.

8. The controller according to claim 7, wherein the safety control part comprises a signal generating unit, generating an enabling signal including information regarding whether manual control of the robot by means of the TPU is permitted or not, and the main control part comprises an input unit, receiving said enabling signal from the safety control part and the main control part is adapted to permit or not permit manual control of the robot based on the received enabling signal.

* * * * *